United States Patent [19]

Ohashi et al.

[11] Patent Number: 4,660,461
[45] Date of Patent: Apr. 28, 1987

[54] AIR CONDITIONER

[75] Inventors: Toshio Ohashi, Atsugi; Yoshiro Ichimaru, Yokohama; Junpei Ishimaru; Hirofumi Hagikura, both of Sano, all of Japan

[73] Assignee: Nissan Motor Company, Limited, Kanagawa, Japan

[21] Appl. No.: 752,716

[22] Filed: Jul. 8, 1985

[30] Foreign Application Priority Data

Jul. 10, 1984 [JP] Japan .................. 59-141496

[51] Int. Cl.⁴ ............................................. B60H 1/00
[52] U.S. Cl. .................................. 98/2.01; 165/43; 236/13
[58] Field of Search ............... 236/13, 49; 98/2.08, 98/2.01; 165/25, 43, 22; 237/12.3 A

[56] References Cited

U.S. PATENT DOCUMENTS

| 4,086,781 | 5/1978 | Brody et al. ................. 236/49 X |
| 4,354,547 | 10/1982 | Sugiura ........................ 165/25 |
| 4,356,965 | 11/1982 | Matsushima et al. ......... 236/13 X |
| 4,518,032 | 5/1985 | Funasaki et al. ............. 98/2.01 X |
| 4,519,443 | 5/1985 | Sutoh et al. ................. 98/2.08 X |
| 4,523,715 | 6/1985 | Ohsawa et al. .............. 165/43 X |
| 4,540,040 | 9/1985 | Fukumoto et al. .......... 165/43 X |

Primary Examiner—William E. Wayner
Attorney, Agent, or Firm—Schwartz, Jeffery, Schwaab, Mack, Blumenthal & Evans

[57] ABSTRACT

First and second outlets direct conditioned air into a vehicular passenger compartment. When one of the outlets is blocked, the other outlet is unblocked. A control arrangement ensures that the temperature of the output air is the same regardless of which outlet is unblocked. This is achieved by adjusting the position of an air mix door, which determines the extent to which air is heated before being delivered as conditioned air, in accordance with which outlet is unblocked.

13 Claims, 4 Drawing Figures

4,660,461

AIR CONDITIONER

BACKGROUND OF THE INVENTION

1. Field of the Invention

This invention relates to an air conditioner.

2. Description of the Prior Art

Many air conditioners for automotive vehicles include upper and lower outlets through which conditioned air is discharged into the interiors of vehicles. Since the upper and lower outlets usually have different positional relationships with a heating element in the air conditioner, the temperature of air flowing through the upper outlet tends to differ from the temperature of air flowing through the lower outlet. Accordingly, when one of the upper and lower outlets is blocked and the other is unblocked, i.e., if the active outlet is changed, the temperature of air put out by the air conditioner also changes.

SUMMARY OF THE INVENTION

It is an object of this invention to provide an air conditioner discharging air, the temperature of which is independent of which outlet is active.

In accordance with an air conditioner of this invention, conditioned air is discharged through first and second outlets into a space being air conditioned. When one of the outlets is blocked, the other outlet is unblocked. A control arrangement adjusts temperature of the discharged air to be independent of which outlet is unblocked.

BRIEF DESCRIPTION OF THE DRAWINGS

Like and corresponding elements are denoted by the same reference numerals throughout the drawings.

DESCRIPTION OF THE PREFERRED EMBODIMENTS

Figure 1:
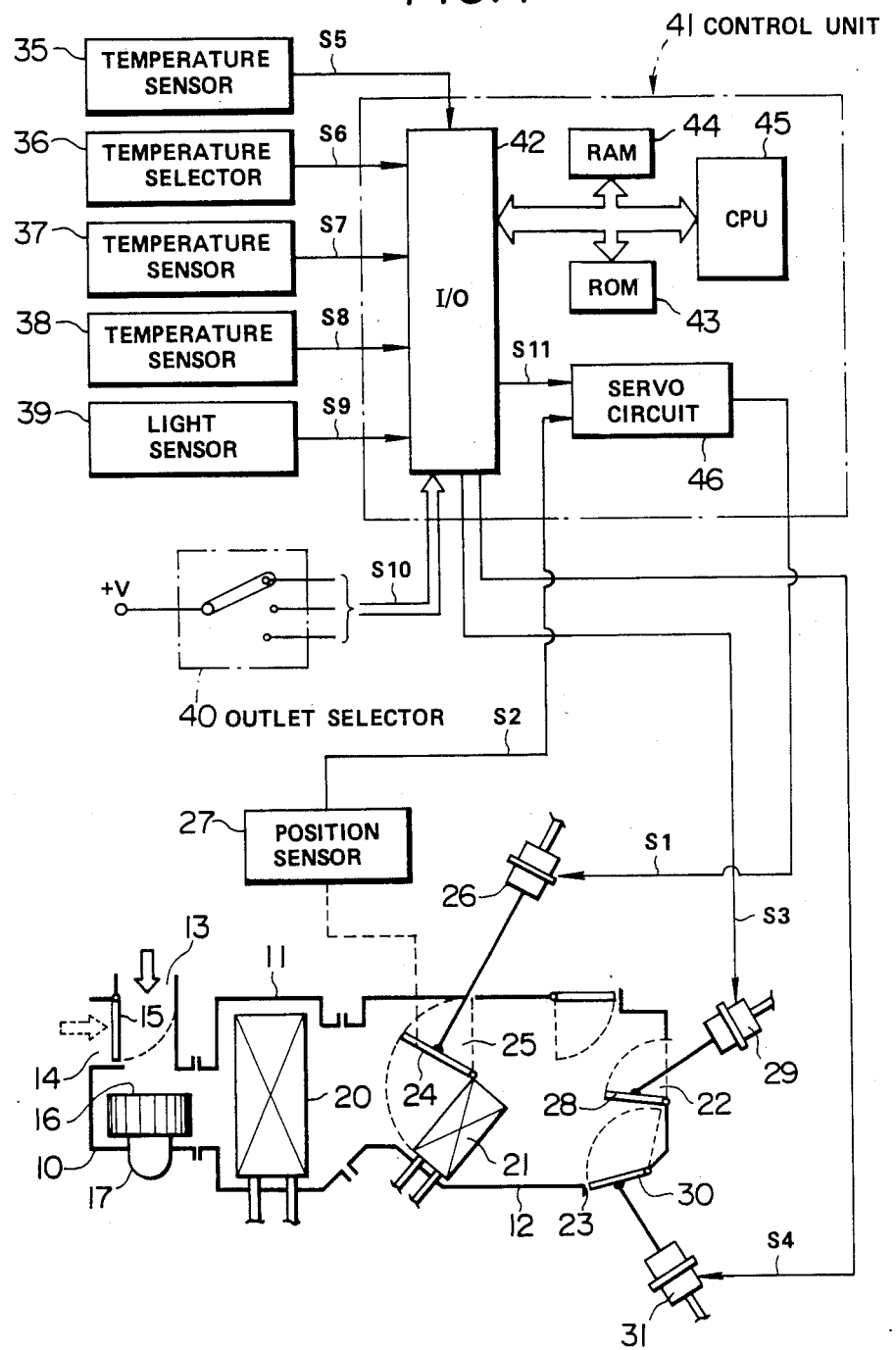
FIG. 1 is a diagram of a first embodiment of this invention.

With reference to FIG. 1 showing a first embodiment of this invention, an air conditioner for a vehicle includes a series combination of upstream, intermediate, and downstream ducts 10, 11, and 12. The upstream duct 10 has two inlets 13 and 14 leading from outside and from inside the vehicle respectively. An intake door 15 disposed within the upstream duct 10 can pivot between first and second positions. When the intake door 15 is in its first position, it blocks the exterior inlet 13 and unblocks the interior inlet 14. When the intake door 15 is in its second position, it unblocks the exterior inlet 13 and blocks the interior inlet 14. A fan 16 disposed within the upstream duct 10 downstream of the intake door 15 draws in air via the inlets 13 and 14. A motor 17 drives the fan 16. When the intake door 15 is in its first position, air is drawn from the interior or the passenger compartment of the vehicle into the upstream duct 10 via the interior inlet 14. When the intake door 15 is in its second position, air is drawn from the exterior of the vehicle into the upstream duct 10 via the exterior inlet 13.

A cooling system includes an evaporator 20 disposed within the intermediate duct 11. The evaporator 20 cools air driven into the intermediate duct 11 from the upstream duct 10 by the fan 16. After passing through the evaporator 20, air moves from the intermediate duct 11 into the downstream duct 12.

A heating system includes a heater core or heat exchanger 21 disposed within the downstream duct 12. The heater core 21 has internal passages through which vehicular engine coolant flows. The heater core 21 heats air which has entered the downstream duct 12. The downstream duct 12 has an upper outlet 22 and a lower outlet 23 leading to the interior or the passenger compartment of the vehicle. Air moves from the downstream duct 12 into the passenger compartment via the outlets 22 and 23. Air exits from the upper outlet 22 at the chest level of the vehicle passengers. Air from the lower outlet 23 is directed toward the legs of the passengers.

An air mix door 24 disposed within the downstream duct 12 can pivot between first and second limit positions. When the air mix door 24 is in its first limit position, it blocks the front face or inlet of the heater core 21 and unblocks a passage 25 bypassing the heater core 21. In this case, essentially all of air which has entered the downstream duct 12 bypasses the heater core 21 and then exists from the duct 12 so that the heater core 21 does not affect the temperature of the outgoing air. This first limit position is called the coolest position. When the air mix door 24 is in its second limit position, it unblocks the front face or inlet of the heater core 21 and blocks the bypass passage 25. In this case, essentially all of air flows through the heater core 21 so that the heater core 21 has a maximal effect on the temperature of the outgoing air. This second limit position is called the warmest position. When the air mix door 24 is in a position intermediate between the first and second limit positions, it partially unblocks the front face or inlet of the heater core 21 and also partially unblocks the bypass passage 25. In this case, some of the air flows through the heater core 21 and the rest of the air bypasses the heater core 21 so thaft the heater core 21 has a moderate effect on the temperature of the outgoing air. The air mix door 24 thus adjustably determines how much of the air passes through or bypasses the heater core 21. Specifically, this depends on the position of the air mix door 24. Accordingly, the temperature of discharged or output air depends on the position of the air mix door 24.

An actuator 26 controlled via an electrical signal S1 drives the air mix door 24. The actuator 26 adjusts the position of the air mix door 24 in accordance with the control signal S1.

A position sensor 27 mechanically connected to the air mix door 24 generates an electrical signal S2 representing the actual position of the air mix door 24.

A pivotal upper door or vent door 28 disposed within the downstream duct 12 blocks and unblocks the upper outlet 22. An actuator 29 controlled via an electrical signal S3 drives the upper door 28. The upper door 28 moves between its open and closed positions in accordance with the control signal S3.

A pivotal lower door or floor door 30 disposed within the downstream duct 12 blocks and unblocks the lower outlet 23. An actuator 31 controlled via an electrical signal S4 drives the lower door 30. The lower door 30 moves between its open and closed positions in accordance with the control signal S4.

A temperature sensor 35 generates an electrical signal S5 representing the temperature of air admitted into the upstream duct 10 via the exterior inlet 13 or the interior inlet 14.

A temperature setting section or temperature selector 36 includes a manually-operated potentiometer which generates an electrical signal S6 representing an adjustable target point or desired value of the air temperature within the passenger compartment. Specifically, the amplitude of the signal S6 represents the target temperature. As the potentiometer is adjusted, the amplitude of the signal S6 varies and thus the target temperature also varies.

A temperature sensor 37 generates an electrical signal S7 representing atmospheric temperature or the air temperature outside the vehicle.

A temperature sensor 38 generates an electrical signal S8 representing the actual air temperature within the passenger compartment.

A light or thermal ray sensor 39 generates an electrical signal S9 representing the intensity of sunlight or insolation which affects the air temperature within the passenger compartment.

An outlet selection unit or outlet selector 40 includes a manually-operated switch or a combination of manually-operated switches which generates an electrical signal S10 capable of assuming any one of different three states. When the switch or switches are operated, the state of the signal S10 changes from one to another. When the signal S10 is in its first state or "UPPER" state, the upper outlet 22 is unblocked and the lower outlet 23 is blocked as will be made clear hereinafter. When the signal S10 is in its second state or "LOWER" state, the upper outlet 22 is blocked and the lower outlet 23 is unblocked as will be made clear hereinafter. When the signal S10 is in its third state or "AUTO" state, blocking and unblocking of the outlets 22 and 23 is controlled automatically as will be made clear hereinafter.

The outlet selection unit 40 preferably includes a manually-operated switch having a movable contact and three fixed contacts. The movable contact is able to contact any one of the fixed contacts. The movable contact is connected to the positive terminal +V of a constant voltage source. When the movable contact is in contact with the first, second, and third fixed contacts, the outlet selection signal S10 is in its first, second, and third states, respectively.

A control unit 41 includes the combination of an input/output (I/O) circuit 42, a read-only memory (ROM) 43, a random-access memory (RAM) 44, and a central processing unit (CPU) 45. The I/O circuit 42 is electrically connected to the elements 35–40 to receive the signals S5–S10. The I/O circuit 42 is electrically connected to output the signals S3 and S4 to the actuators 29 and 31. The I/O circuit 42 also outputs an electrical signal S11 representing a target or desired position of the air mix door 24.

The control unit 41 includes a servo circuit 46 which is electrically connected to the position sensor 27 and the I/O circuit 42 to receive the signals S2 and S11 representing the actual position and the desired position of the air mix door 24. The servo circuit 46 includes a comparator or a difference amplifier which determines the difference between the signals S2 and S11 representing the difference between the actual and desired positions of the air mix door 24. The servo circuit 46 generates the control signal S1 on the basis of the difference between the signals S2 and S11. The control signal S1 is designed so that the actual position of the air mix door 24 will track or remain equal to its desired position.

Figure 2:
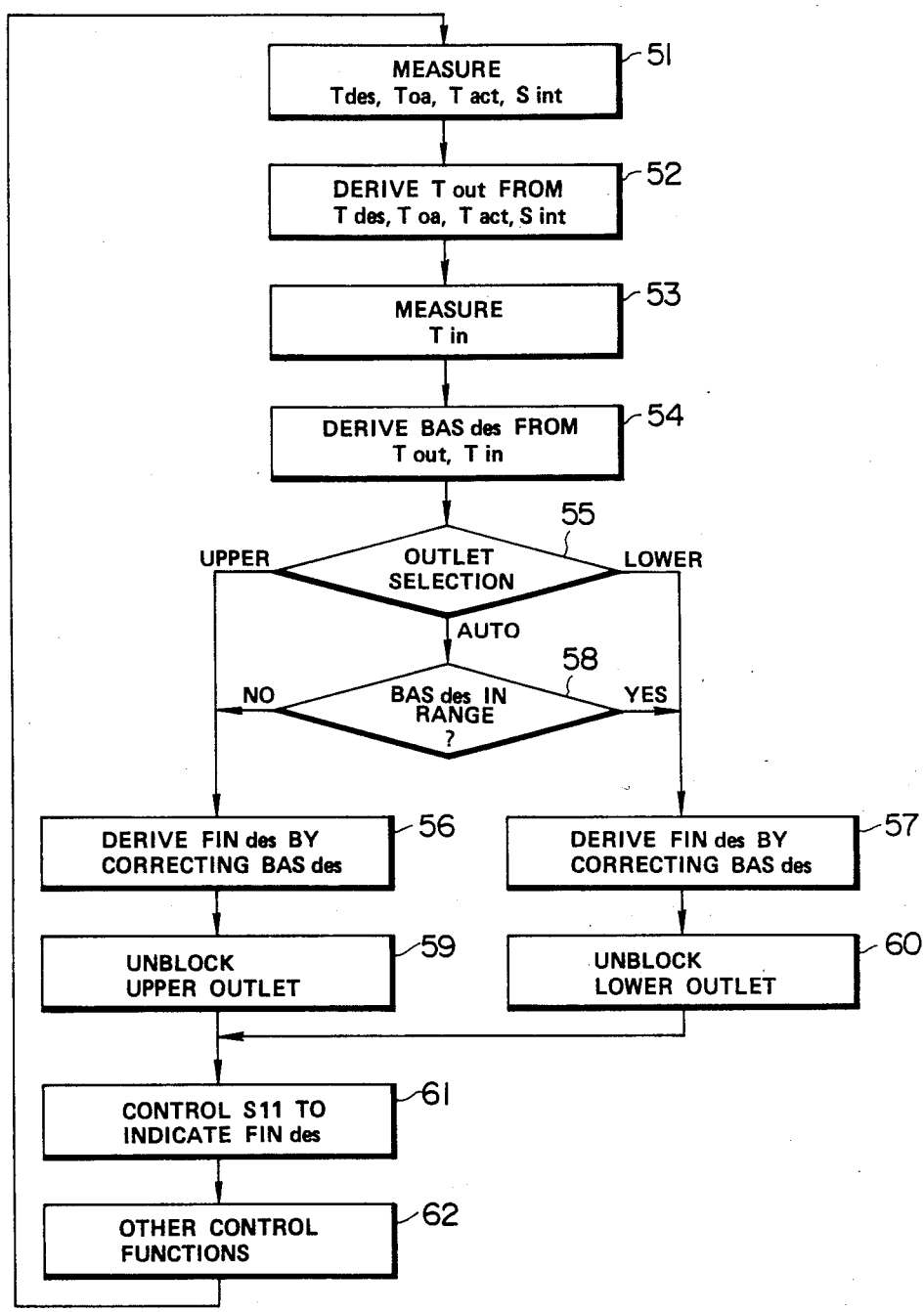
FIG. 2 is a flowchart of a program for controlling operation of the control unit of FIG. 1.

The combination of the I/O circuit 42, the ROM 43, the RAM 44, and the CPU 45 operates in accordance with a program stored in the ROM 43. FIG. 2 is a flowchart of this program.

As illustrated in FIG. 2, in a first block 51 of the program, the current values of the desired temperature in the passenger compartment, atmospheric temperature, the actual temperature in the passenger compartment, and the intensity of sunlight are measured from the signals S6–S9. In the program, the variables Tdes, Toa, Tact, and Sint represent these values of the desired temperature in the passenger compartment, the atmospheric temperature, the actual temperature in the passenger compartment, and the intensity of sunlight, respectively.

In a block 52 following the block 51, a desired value of the temperature of air discharged into the passenger compartment is determined on the basis of the values Tdes, Toa, Tact, and Sint derived in the preceding block 51. In the program, the variable Tout represents this desired value of the temperature of discharged air, that is, output air. The determination of the desired temperature value Tout involves a preset function of the values Tdes, Toa, Tact, and Sint.

In a block 53 following the block 52, the current value of the temperature of air admitted into the air conditioner is measured from the signal S5. In the program, the variable Tin represents this value of the temperature of admitted air, that is, intake air.

In a block 54 following the block 53, the basic desired or target position of the air mix door 24 is determined on the basis of the values Tout and Tin derived in the previous blocks 52 and 53. In the program, the variable BASdes represents this basic desired position of the air mix door 24. The determination of the basic desired position BASdes uses a preset linear function of the values Tout and Tin.

In a block 55 following the block 54, the state of the signal S10 from the outlet selection unit 40 is checked. If the signal S10 is in its "UPPER" state, the program advances to a block 56. If the signal S10 is in its "LOWER" state, the program advances to a block 57. If the signal S10 is in its "AUTO" state, the program advances to a block 58.

In the block 58, a determination is made as to whether or not the basic desired position BASdes derived in the previous block 54 resides within a preset range. If the position BASdes resides within the preset range, the program advances to the block 57. If the position value BASdes does not reside within the preset range, the program advances to the block 56.

In the block 56, the final desired or target position of the air mix door 24 is derived by correcting the basic desired position BASdes determined in the previous block 54. In the program, the variable FINdes represents this final desired position of the air mix door 24. The final desired position FINdes is preferably derived using a memory table in which a set of final desired position values are plotted as a preset function of the basic desired positions BASdes. The ROM 43 holds this table.

The final desired position FINdes may also be directly calculated from a preset function of the basic desired position values BASdes.

In a block 59 following the block 56, the signals S3 and S4 to the actuators 29 and 31 are controlled to unblock the upper outlet 22 and block the lower outlet 23.

In the block 57, the final desired or target position FINdes of the air mix door 24 is derived by correcting the basic desired position BASdes determined in the previous block 54. This correction of the basic desired position BASdes differs from the corresponding correction in the block 56 as will be made clear hereinafter. The final desired position FINdes is preferably derived using a memory table in which a set of final desired position values are plotted as a preset function of the basic desired position values BASdes. The ROM 43 holds this table.

The final desired position FINdes may also be directly calculated from a preset function of the basic desired position values BASdes.

In a block 60 following the block 57, the signals S3 and S4 to the actuators 29 and 31 are controlled to unblock the lower outlet 23 and block the upper outlet 22.

In a block 61 following one of the blocks 59 and 60, the signal S11 is controlled to indicate the final desired position FINdes derived in one of the previous blocks 56 and 57.

After the block 61, the program returns to the first block 51 by ay of a block 62 for other controls (not described). Thus, the program reiterates periodically so that the output signals S3, S4, S11 are updated in accordance with the incoming signals S5–S10.

The combination of the blocks 55 and 59 allows the upper outlet 22 to be unblocked when the outlet selection signal S10 assumes its "UPPER" state. The combination of the blocks 55 and 60 allows the lower outlet 23 to be unblocked when the outlet selection signal S10 assumes its "LOWER" state. The combination of the blocks 55 and 58 allows blocking and unblocking of the outlets 22 and 23 to be controlled automatically in accordance with the basic desired position BASdes of the air mix door 24 when the outlet selection signal S10 assumes its "AUTO" state.

The correction of the basic desired position BASdes of the air mix door 24 in the block 56 differs from the corresponding correction in the block 57. Accordingly, the final desired position FINdes of the air mix door 24 depends on which outlet is selected, that is, which outlet is unblocked. The difference between the corrections in the blocks 56 and 57 is designed so that the temperature of air exiting from the upper outlet 22 is equal to the temperature of air exiting from the lower outlet 23 under the same conditions.

The temperarture of air exiting from the upper outlet 22 tends to be lower than the temperature of air exiting from the lower outlet 23 in the structure of FIG. 1. The difference between the corrections in the blocks 56 and 57 is specifically designed so that the final desired position of the air mix door 24 when the upper outlet is selected is closer to the warmest position than the final desired position of the air mix door 24 when the lower outlet 23 is selected. It should be noted that as the air mix door 24 moves toward its warmest or second limit position, the inlet of the heater core 21 is progressively unblocked and thus the effect of the heater core 21 is enhanced.

Figure 3:
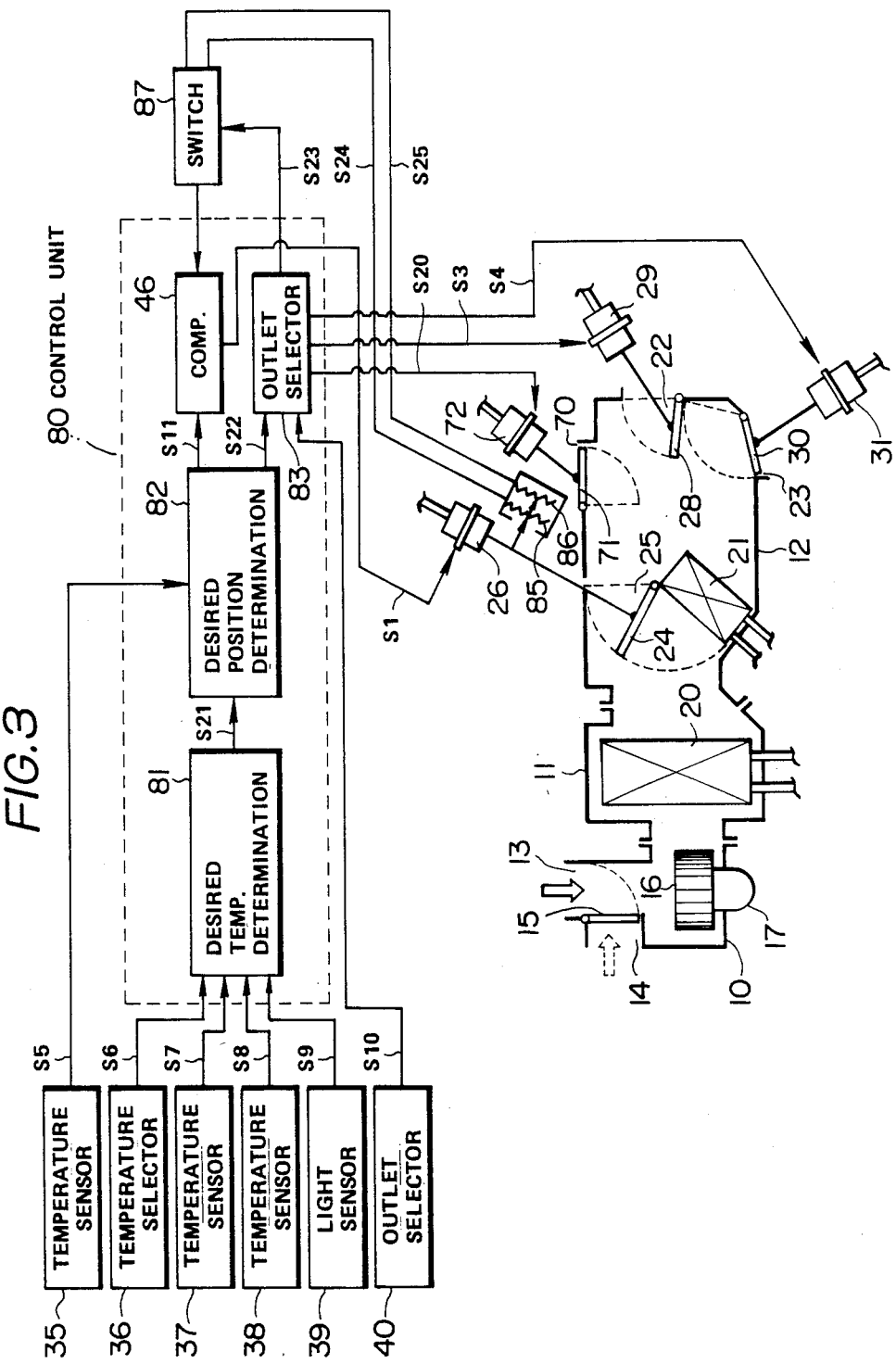
FIG. 3 is a diagram of a second embodiment of this invention.

FIG. 3 shows a second embodiment of this invention. This embodiment differs from the embodiment of FIGS. 1 and 2 as described below.

The downstream duct 12 has a defroster nozzle or outlet 70 located immediately below a front windshield or window of the vehicle. A pivotal defroster door 71 disposed within the downstream duct 12 blocks and unblocks the defroster nozzle 70. An actuator 72 controlled via an electrical signal S20 drives the defroster door 71. The defroster door 71 moves between its open and closed positions in accordance with the control signal S20.

A control unit 80 includes a desired temperature determination circuit 81 which is connected to the sensors 36–39 to receive the signals S6–S9. The determination circuit 81 includes analog-to-digital conveters, and a digital calculation section. The analog-to-digital converters change the analog signals S6–S9 into corresponding digital signals which are then applied to the calculation section. The calculation section determines the desired temperature of air discharged into the passenger compartment on the basis of the current values of the desired temperature in the passenger compartment, the atmospheric temperature, the actual temperature in the passenger compartment, and the intensity of sunlight measured via the signals S6–S9. The desired temperature of discharged air is derived using a preset function or equation. The determination circuit 81 outputs a signal S21 representing the desired temperature of discharged air.

The control unit 80 includes a desired position determination circuit 82 which is connected to the sensor 35 and the desired temperature determination circuit 81 to receive the signals S5 and S21. The determination circuit 82 includes an analog-to-digital converter and a digital calculation section. The analog-to-digital converter changes the analog signal S5 into a corresponding digital signal which is then applied to the calculation section. The calculation section determines the desired position of the air mix door 24 on the basis of the current temperature of admitted air and the desired temperature of discharged air derived from the signals S5 and S21. The determination of the desired position of the air mix door 24 involves a preset linear function or equation. A digital-to-analog converter connected to the calculation section outputs a signal S11 representing the desired position of the air mix door 24. The determination circuit 82 outputs an outlet selection signal S22 which depends on the desired position of the air mix door 24.

It should be noted that the determination circuits 81 and 82 may include a common microcomputer system.

The control unit 80 includes an outlet selection circuit 83 which is connected to the manually-operated unit 40 and the desired position determination circuit 82 to receive the signals S10 and S22. The outlet selection circuit 83 generates the signals S3, S4, and S20 in accordance with the signals S10 and S22. When the selection unit 40 is in its "AUTO" position, blocking and unblocking of the doors 28, 30, and 71 are controlled automatically in accordance with the desired position of the air mix door 24 via the signal S22. When the selection unit 40 is in one of the other positions, blocking and unblocking of the doors 28, 30, and 71 are controlled in accoradance with the requirements of the passenger. The outlet selection circuit 83 generates a signal S23 in accordance with the signals S10 and S22. This signal S23 represents which outlet is unblocked or selected.

Specifically, when the upper outlet 22 is unblocked and the lower outlet 23 is blocked, the voltage of the signal S23 is high. When the upper outlet 22 is blocked and the lower outlet 23 is unblocked, the voltage of the signal S23 is low.

Variable resistors or potentiometers 85 and 86 have respective movable control arms, the positions of which adjustably determine the respective resistances of the resistors. The control arms are connected to a shaft linking the actuator 26 to the air mix door 24 so that the resistances of the resistors 85 and 86 depend on the position of the air mix door 24.

Figure 4:
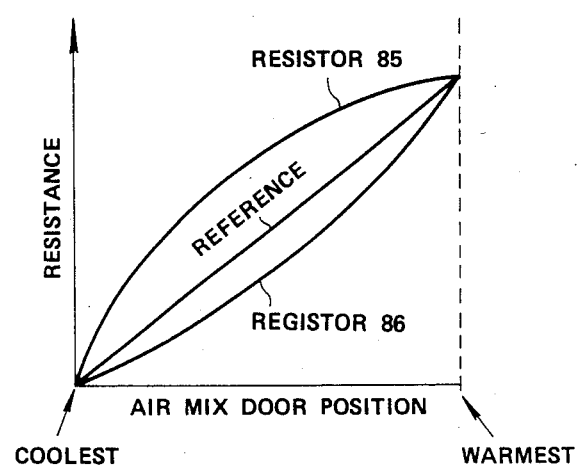
FIG. 4 is a graph of the resistances of the variable resistors versus the position of the air mix door of FIG. 3.

FIG. 4 shows the relationship between the resistances of the resistor 85 and 86 and the position of the air mix door 24. As the air mix door 24 moves from its first limit position in which the inlet of the heater core 21 is fully blocked to its second limit position in which the inlet of the heater core 21 is fully unblocked, the resistance of the resistor 85 increases in a convex-upward curve and the resistance of the resistor 86 increases in a concave-upward curve. When the air mix door 24 is at either of its first and second limit positions, the resistances of the resistors 85 and 86 are equal. When the air mix door 24 is at a position between the two limit positions, the resistance of the resistor 85 is greater than the resistance of the resistor 86.

It should be noted that the resistors 85 and 86 may include series and/or parallel combinations of variable resistors and fixed resistors.

The variable resistors 85 and 86 are electrically connected to a constant voltage source (not shown) so that they outputs signals S24 and S25 having voltages linearly depending on the resistances.

In FIG. 4, the straight line is a reference representing the resistance characteristics of an imaginary resistor which linearly and thus accurately reflects the position of the air mix door 24. As is understood from FIG. 4, the signal S24 from the resistor 85 represents a fictitious position of the air mix door 24 which depends on but usually deviates from its actual position toward the warmest or second limit position. The signal S25 represents a fictitious position of the air mix door 24 which depends on but usually deviates from its actual position toward the coolest or first limit position.

A switch circuit 87 includes a relay having a control winding supplied with the signal S23 from the outlet selection circuit 83. The relay has a switch segment which is connected to the variable resistors 85 and 86 to receive the signals S24 and S25. The switch segment is also connected to the servo comparator 46. The switch circuit 87 selects and passes one of the signals S24 and S25 to the servo comparator 46 in accordance with the signal S23. Specifically, when the voltage of the signal S23 is high, that is, when the upper outlet 22 is selected and unblocked, the switch circuit 87 passes the signal S25. When the voltage of the signal S23 is low, that is, when the lower outlet 23 is selected and unblocked, the switch circuit 87 passes the signal S24.

The servo comparator 46 generates the control signal S1 in accordance with the signal S11 representing the desired position of the air mix door 24 and the signal S24 or S25 representing the fictitious position of the air mix door 24. The control signal S1 depends on the difference between the desired position and the fictitious position of the air mix door 24. The control signal S1 is designed so that the fictitious position of the air mix door 24 will track or remain equal to the desired position thereof.

When the upper outlet 22 is selected and unblocked, the switch circuit 87 passes the signal S25 so that the position of the air mix door 24 is controlled in accordance with the signals S11 and S25 representing the desired position and the fictitious position of the air mix door 24. When the lower outlet 23 is selected and unblocked, the switch circuit 87 passes the signal S24 so that the position of the air mix door 24 is controlled in accordance with the signals S11 and S24 representing the desired position and the fictitious position of the air mix door 24. As is understood from FIG. 4, at the same actual position of the air mix door 24, the fictitious position of the air mix door 24 represented by the signal S24 is usually closer to the warmest position than the fictitious position of the air mix door 24 represented by the signal S25 is. Accordingly, at the same desired position of the air mix door 24, the controlled actual position of the air mix door 24 when the upper outlet 22 is selected is usually closer to the warmest position than the controlled actual position of the air mix door 24 when the lower outlet 23 is selected. This enables the temperature of discharged or output air to be independent of which outlet is selected. It should be noted that in the structure of FIG. 3, the temperature of air exiting from the upper outlet 22 tends to be lower than the temperature of air exiting from the lower outlet 23 at the same position of the air mix door 24. The resistance characteristics of the resistors 85 and 86 are chosen so that the temperature of output air will be independent of which outlet is selected.

In a modification to the embodiment of FIGS. 3 and 4, the temperature of air exiting from the defroster outlet 70 is similarly made equal to the temperature of air exiting from the other outlets 22 and 23. In this modification, a third variable resistor having characteristics different from the characteristics of the variable resistors 85 and 86 outputs a signal which depends on the position of the air mix door 24 and which is selected when the defroster outlet 70 is unblocked.

The embodiment of FIGS. 3 and 4 can be applied to air conditioners having various types of downstream ducts simply by changing the characteristics of the variable resistors 85 and 86. It should be noted that applications of the embodiment of FIGS. 1 and 2 to such various types of air conditioners require changes to the control program which may be costlier than the required changes to the resistors 85 and 86.

What is claimed is:
1. An air conditioner for a vehicle, comprising:
   (a) first and second outlets through which conditioned air is discharged into an interior of the vehicle;
   (b) means for blocking an arbitrary one of the outlets and unblocking the other;
   (c) a movable air mix door having different positional relationships with the first and second outlets respectively, temperature of the discharged air depending on the position of the air mix door;
   (d) means for generating a signal representing a desired position of the air mix door;
   (e) means for generating a signal representing a first fictitious position of the air mix door which depends on but deviates from the actual position of the air mix door;
   (f) means for generating a signal representing a second fictitious position of the air mix door which depends on but deviates from the actual position of the air mix door, the second fictitious position differing from the first fictitious position; and
(g) means for controlling the position of the air mix door in accordance with the desired position signal and the first fictitious position signal when the first outlet is unblocked, and for controlling the position of the air mix door in accordance with the desired position signal and the second fictitious position signal when the second outlet is unblocked.

2. The air conditioner of claim 1, wherein the first fictitious position is made equal to the desired position when the first outlet is unblocked, and the second fictitious position is made equal to the desired position when the second outlet is unblocked.

3. The air conditioner of claim 1, wherein the first fictitious position signal generating means comprises a first variable resistor having an adjustable resistance which depends on the position of the air mix door, and wherein the second fictitious position signal generating means comprises a second variable resistor having an adjustable resistance which depends on the position of the air mix door, the resistance of the first resistor varying with the position of the air mix door in a manner differing from the way the resistance of the second resistor varies with the position of the air mix door.

4. The air conditioner of claim 1, wherein the first outlet directs the discharged air at the level of the chests of vehicle passengers, and the second outlet directs the discharged air toward the legs of the passengers.

5. An air conditioner, comprising:
(a) first and second outlets through which conditioned air is discharged into a space being air conditioned;
(b) means for blocking an arbitrary one of the outlets and unblocking the other outlet; and
(c) means for adjusting temperature of the discharged air to be independent of which outlet is unblocked, said means for adjusting temperature comprising:
(a) a movable air mix door having different positional relationships with the first and second outlets respectively, the temperature of the discharged air depending on the position of the air mix door; and
(b) means for changing the position of the air mix door in accordance with which outlet is unblocked.

6. An air conditioner, comprising:
(a) first and second outlets through which conditioned air is discharged into a space being air conditioned;
(b) means for blocking an arbitrary one of the outlets and unblocking the other outlet;
(c) means for adjusting temperature of the discharged air to be independent of which outlet is unblocked, said means for adjusting temperature comprising:
(a) a movable air mix door having different positional relationships with the first and second outlets respectively, temperature of the discharged air depending on the position of the air mix door;
(b) means for generating a signal representing a desired position of the air mix door;
(c) means for generating a signal representing a first fictitious position of the air mix door which depends on but deviates from the actual position of the air mix door;
(d) means for generating a signal representing a second fictitious position of the air mix door which depends on but deviates from the actual position of the air mix door, the second fictitious position differing from the first fictitious position; and
(e) means for controlling the position of the air mix door in accordance with the desired position signal and the first fictitious position signal when the first outlet is unblocked, and for controlling the position of the air mix door in accordance with the desired position signal and the second fictitious position signal when the second outlet is unblocked.

7. The air conditioner of claim 6, wherein the first fictitious position is made equal to the desired position when the first outlet is unblocked, and the second fictitious position is made equal to the desired position when the second outlet is unblocked.

8. The air conditioner of claim 6, wherein the first fictitious position signal generating means comprises a first variable resistor having an adjustable resistance which depends on the position of the air mix door, and wherein the second fictitious position signal generating means comprises a second variable resistor having an adjustable resistance which depends on the position of the air mix door, the resistance of the first resistor varying with the position of the air mix door in a manner differing from the way the resistance of the second resistor varies with the position of the air mix door.

9. The air conditioner of claim 6, wherein the first outlet directs the discharged air at the level of the chests of vehicle passengers, and the second outlet directs the discharge air toward the legs of the passengers.

10. An air conditioner, comprising:
(a) first and second outlets through which conditioned air is discharged into a space being air conditioned;
(b) means for blocking an arbitrary one of the outlets and unblocking the other outlet; and
(c) means for adjusting temperature of the discharged air to be independent of which outlet is unblocked, said means for adjusting temperature comprising:
(a) a movable air mix door having different positional relationships with the first and second outlets respectively, temperature of the discharged air depending on the position of the air mix door;
(b) means for generating a first signal representing a desired position of the air mix door;
(c) means for generating a second signal depending on actual position of the air mix door;
(d) means for generating a third signal depending on actual position of the air mix door, the dependency of the third signal on the actual position of the air mix door differing from the dependency of the second signal on the actual position of the air mix door; and
(e) means for controlling the position of the air mix door in accordance with the first signal and the second signal when the first outlet is unblocked, and for controlling the position of the air mix door in accordance with the first signal and the third signal when the second outlet is unblocked.

11. The air conditioner of claim 10, wherein the second signal generating means comprises a first resistor having a resistance which varies as a function of the actual position of the air mix door, and the third signal generating means comprises a second resistor having a resistance which varies as a function of the actual position of the air mix door, and the function between the resistance of the first resistor and the actual position of the air mix door differs from the function between the resistance of the second resistor and the actual position of the air mix door.

12. An air conditioner for a vehicle, comprising:
(a) first and second outlets through which conditioned air is discharged into an interior of the vehicle;
(b) means for blocking an arbitrary one of the outlets and unblocking the other;
(c) a movable air mix door having different positional relationships with the first and second outlets respectively, temperature of the discharged air depending on the position of the air mix door;
(d) means for generating a first signal representing a desired position of the air mix door;
(e) means for generating a second signal depending on actual position of the air mix door;
(f) means for generating a third signal depending on actual position of the air mix door, the dependency of the third signal on the actual position of the air mix door differing from the dependency of the second signal on the actual position of the air mix door;
(g) means for controlling the position of the air mix door in accordance with the first signal and the second signal when the first outlet is unblocked, and for controlling the position of the air mix door in accordance with the first signal and the third signal when the second outlet is unblocked.

13. The air conditioner of claim 12, wherein the second signal generating means comprises a first resistor having a resistance which varies as a function of the actual position of the air mix door, and the third signal generating means comprises a second resistor having a resistance which varies as a function of the actual position of the air mix door, and the function between the resistance of the first resistor and the actual position of the air mix door differs from the function between the resistance of the second resistor and the actual position of the air mix door.

* * * * *